United States Patent [19]

Mack

[11] 4,437,176
[45] Mar. 13, 1984

[54] METHOD OF OPTIMIZING SIGNAL-TO-NOISE RATIO IN SEISMIC EXPLORATION

[75] Inventor: Harry Mack, Irving, Tex.

[73] Assignee: Mobil Oil Corporation, New York, N.Y.

[21] Appl. No.: 220,549

[22] Filed: Dec. 29, 1980

[51] Int. Cl.³ .............................................. G01V 1/36
[52] U.S. Cl. ..................................... 367/38; 367/52; 367/56
[58] Field of Search ....................... 367/41, 42, 40, 50, 367/52, 53, 63, 37, 38, 56

[56] References Cited

U.S. PATENT DOCUMENTS

| | | | |
|---|---|---|---|
| 1,676,619 | 7/1928 | McCollum | 367/38 X |
| 3,387,258 | 6/1968 | Goupillaud et al. | 367/49 X |
| 3,449,047 | 6/1969 | Hartmann | 367/37 |
| 3,651,451 | 3/1972 | Ruehle | 367/42 |
| 3,696,331 | 10/1972 | Guinzy et al. | 367/53 |
| 4,206,509 | 6/1980 | Ruehle | 367/42 |
| 4,293,935 | 1/1981 | Gros et al. | 367/49 X |
| 4,316,268 | 2/1982 | Ostrander | 367/50 X |
| 4,330,872 | 5/1982 | Bratton | 367/43 |

OTHER PUBLICATIONS

J. A. Coffeen, "Seismic Exploration Fundamentals", PPC Books, Division of the Petroleum Publishing Co., Tulsa, Oklahoma, pp. 108, 109, and FIGS. 5-15.

Primary Examiner—S. C. Buczinski
Assistant Examiner—K. R. Kaiser
Attorney, Agent, or Firm—A. J. McKillop; M. G. Gilman; J. F. Powers, Jr.

[57] ABSTRACT

A method for improvement of the signal-to-noise ratio of seismic data records comprising determination of the angle of incidence of acoustic waves transmitted into the earth with respect to subterranean reflecting layers which yields minimum attenuation of the acoustic wave during passage through intermediate layers is disclosed. The offset or distance between source and receiver is then selected so that the waves used to generate representations of the structure of the earth are incident on the reflector at substantially the optimal angle, thus yielding maximum signal strength, and maximizing the signal-to-noise ratio. Minimum offsets, to eliminate multiple surface/evaporite layer reflections from seismic records may be indicated as well.

3 Claims, 17 Drawing Figures

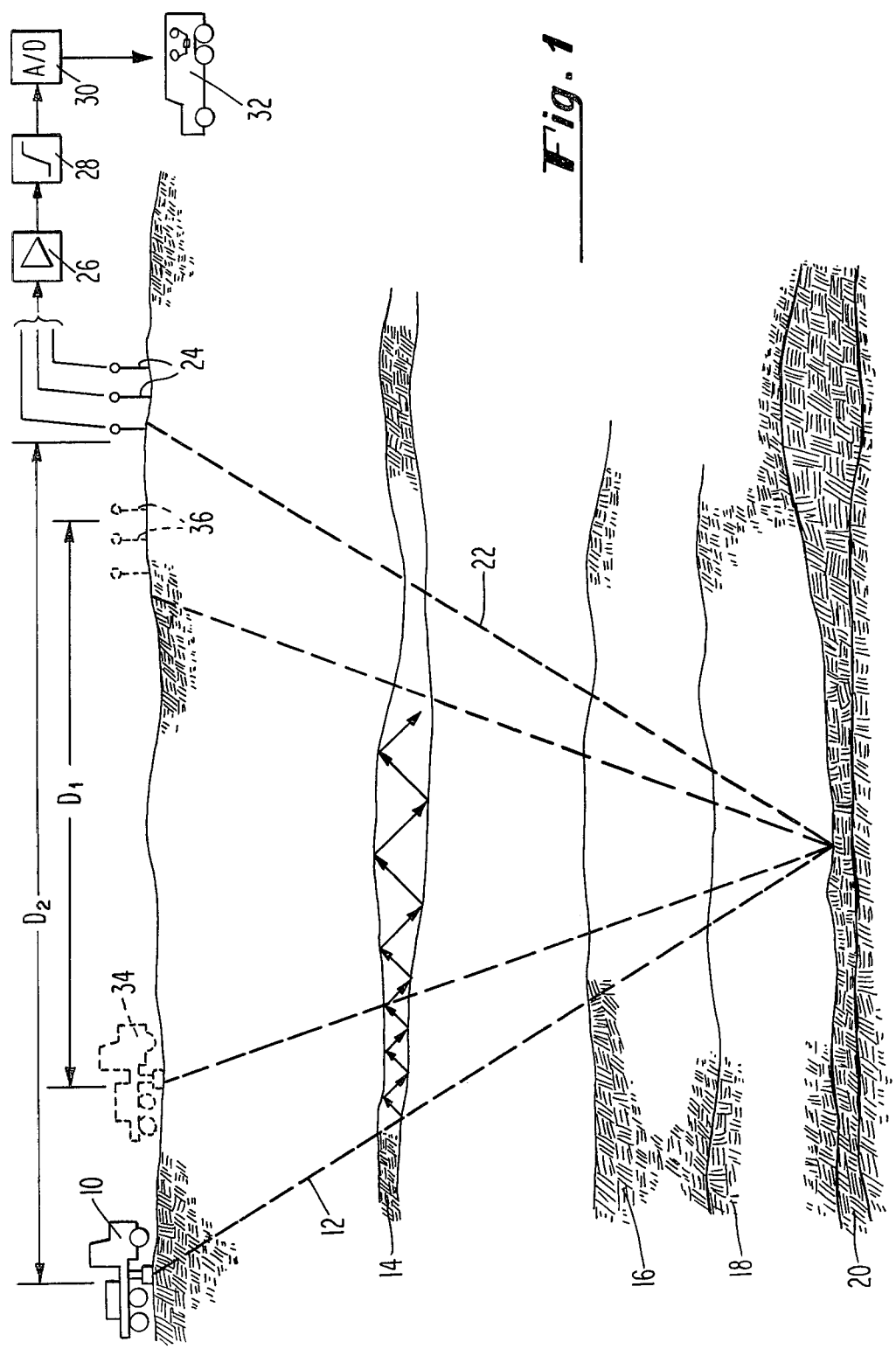

4,437,176

METHOD OF OPTIMIZING SIGNAL-TO-NOISE RATIO IN SEISMIC EXPLORATION

FIELD OF THE INVENTION

This invention relates to the field of seismic exploration for oil, gas and other valuable minerals. More particularly, the invention relates to methods of producing improved representations of the subterranean structure of the earth, by improvement of the signal-to-noise ratio of recorded seismic signals.

BACKGROUND OF THE INVENTION

Seismic surveying for oil, gas and other minerals is a well established practice. According to this method, mechanical vibrations are imparted to the earth by means of, e.g., dropping a heavy weight, detonating a charge of explosives or by shaking a heavy object. The acoustic wave thus generated travels downwardly through the earth, is reflected from interfaces between layers of various types of rock and returns upwardly to the surface of the earth at which point it may be detected by one or more geophones. Typically, a large number of geophones are arrayed in a "spread" on the surface of the earth. By comparison of the times taken by acoustic waves generated and detected at differing points on the earth's surface, a representation of the relative shape of the subterranean interfaces can be generated which is of use to geophysicists in determining the likely presence of oil, gas and other minerals.

One of the chief problems in this seismic surveying technique is that of achieving an adequate signal-to-noise ratio in the geophone output, so as to be able to process the signals thus referred to yield meaningful output. As the acoustic waves imparted to the earth must travel great distances downwardly into the earth, be reflected, and return upwardly (typically the interfaces which are to be mapped are on the order of 15,000 feet below the earth's surface) the attenuation of the signal alone causes relatively low signal-to-noise ratios. In addition, noise is always present in the earth's crust of frequencies comparable to that of the acoustic energy imparted to the earth. Moreover, frequently the waves from a given source can travel in more than one path and at differing velocities to reach the same geophones, thus further obscuring the data and confusing the representation of the subterranean structure generated.

One of the more common methods of reducing noise in seismic records is so-called common depth point (CDP) surveying. According to this method, a plurality of signals are recorded with respect to sources and detectors disposed on either side of a central point at differing distances therefrom such that it can be assumed that the acoustic records recorded are of reflections from a single point on a given layer of subterranean rock, i.e., a common depth point. When these records are mathematically or electrically summed, the noise, being random, tends to cancel out while the signal is reinforced, thus yielding an improvement in the signal-to-noise ratio. It is usual to vary the distance between source and detector, or "offset" between zero and on the order of 10-12,000 feet or more, surveying continuously so as to provide a large number of records for such CDP surveying for summation of records of acoustic energy reflected from a common depth point deep within the earth's crust. However, there are areas of the earth where subterranean conditions render this CDP method alone insufficient to generate a record of exploration having a sufficiently high signal-to-noise ratio as to allow a good representation of the subterranean structure of the earth to be generated. One structure which is known to be very difficult to survey using the CDP method comprises successive layers of evaporites of various types disposed within the earth. It appears that the interfaces between such layers are such as to cause a substantial attenuation of the acoustic waves thus reducing the signal strength which is received at the geophones and lowering the signal-to-noise ratio.

Accordingly, it has been and remains a need of the art to provide an improved signal-to-noise ratio for seismic exploration for oil, gas and other minerals.

OBJECTS OF THE INVENTION

It is an object of the invention therefore to provide an improved method of seismic surveying.

A further object of the invention is to provide a method of seismic surveying wherein the signal-to-noise ratio of the geophone records is improved.

Yet a further object of the invention is to provide a method of seismic surveying useable in areas of difficulty yielding a signal-to-noise ratio greater than unity.

Still a further object of the invention is to provide a method of seismic surveying having a signal-to-noise ratio high enough that areas wherein successive evaporite layers are disposed can be surveyed to yield a useful representation of the earth's structure.

SUMMARY OF THE INVENTION

The present invention involves the discovery that the angle of incidence of an acoustic wave on an interface between evaporite and other rock layers is of significance in the determination of the attenuation undergone by the acoustic wave as it passes through the interface, and moreover, that the attenuation as a function of angle is not a regular or continuous function of the angle of incidence as might be expected, but instead is a generally sinusoidal function, so that in some cases waves having greater angles of incidence are attenuated less than waves arriving at lesser angles of incidence, even though the overall travel distance of the former acoustic wave is longer.

In accordance with an important aspect of the invention, the offset between source and detector is optimized with respect to the attenuation of the acoustic wave, and the offset yielding the minimum attenuation is thereafter used in seismic surveying in that area. In accordance with another important aspect of the invention, a method of seismic surveying is provided according to which experiments are performed in areas of difficulty so as to determine the offset which yields the highest signal-to-noise ratio and the offset determined to be optimum is used in a seismic exploration program. In either case, the experiments may be performed at a home base, after the in field portion of the exploration is entirely completed.

BRIEF DESCRIPTION OF THE DRAWINGS

The invention will be better understood if reference is made to the accompanying drawings, in which:

FIG. 1 represents an overall view of the seismic exploration method of the invention;

FIG. 2, comprising

DESCRIPTION OF THE PREFERRED EMBODIMENTS

Figure 2B:
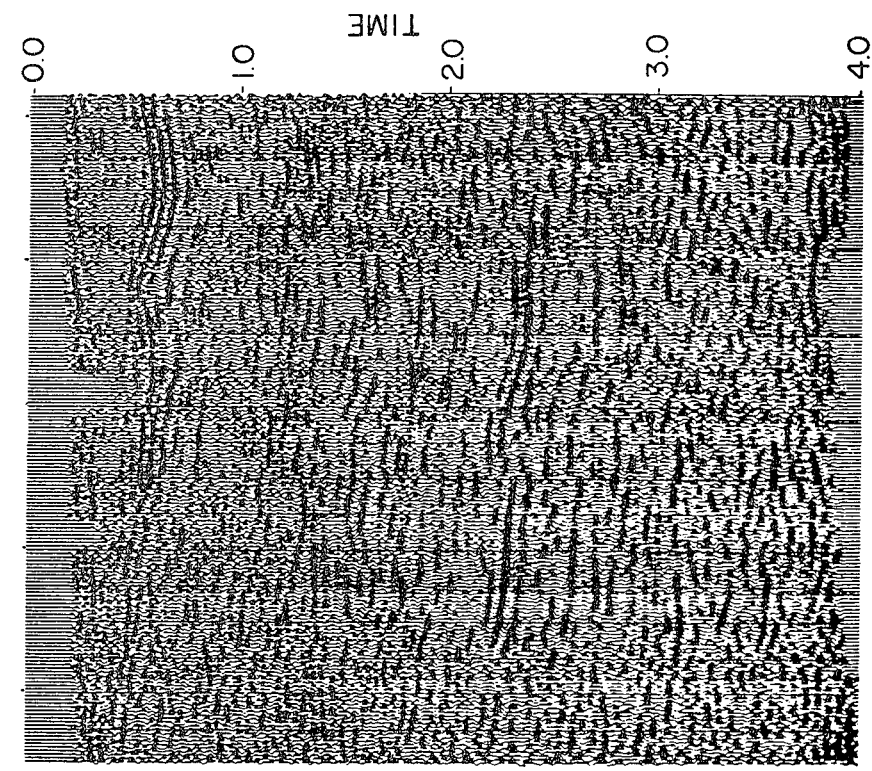
FIGS. 2a and 2b, shows side-by-side seismograms of the same region, according to the prior art in FIG. 2a, and according to the method of the invention in FIG. 2b.

The overall arrangement of the seismic exploration process according to the method of the invention is shown in FIG. 1. A first source of acoustic energy 10 is disposed on the surface of the earth as depicted. The source 10 may be a truck provided with a vibrator for imparting mechanical vibrations to the earth, as in the so-called "Vibroseis" technique. Other sources of acoustic energy are also within the scope of the invention. An acoustic wave 12 travels downwardly from the source of acoustic energy 10 through layers of rock as at 14, 16 and 18 and is reflected from a lower layer 20 of rock of particular interest. In the particular region in which the method of the invention was first tested, the lower layer of rock 20 of particular interest was at the Devonian level, approximately 15,000 feet beneath the surface of the earth. The layers of structure 14 which interfered chiefly with the transmission of acoustic waves such as 12 were layers of evaporites, but it will be understood by those skilled in the art that the method of the invention is applicable to other sorts of materials as well.

After reflection from the layer 20 as well as from the other layers (not shown), an acoustic wave passes upwardly as at 22 and is detected by one or more geophones at 24. The signals from the geophones 24 may as indicated schematically be amplified at amplifier 26, filtered by filter 28, converted to digital form in analog-to-digital converter 30 and recorded in, for example, magnetic tape equipment carried by a second exploration vehicle 32. After a suitable number of acoustic energy impulses have been imparted to the earth at a particular location and recorded by a suitable number of geophones 24 the source of energy 10 is moved to a new location such as shown in phantom at 34 and the process is begun again. The geophones may also be moved as shown in phantom at 36. The offset or distance between the source 10 and the geophones 24 and between the source 34 and geophone 36 thus varies between $D_1$ and $D_2$ as indicated.

The present invention relates to the discovery that under certain circumstances the signal-to-noise ratio of signals received by geophones disposed a longer distance or offset $D_1$ from a source 10, is actually higher than that of signals from a smaller offset $D_2$, and provides a method of seismic exploration utilizing this discovery.

Figure 2A:
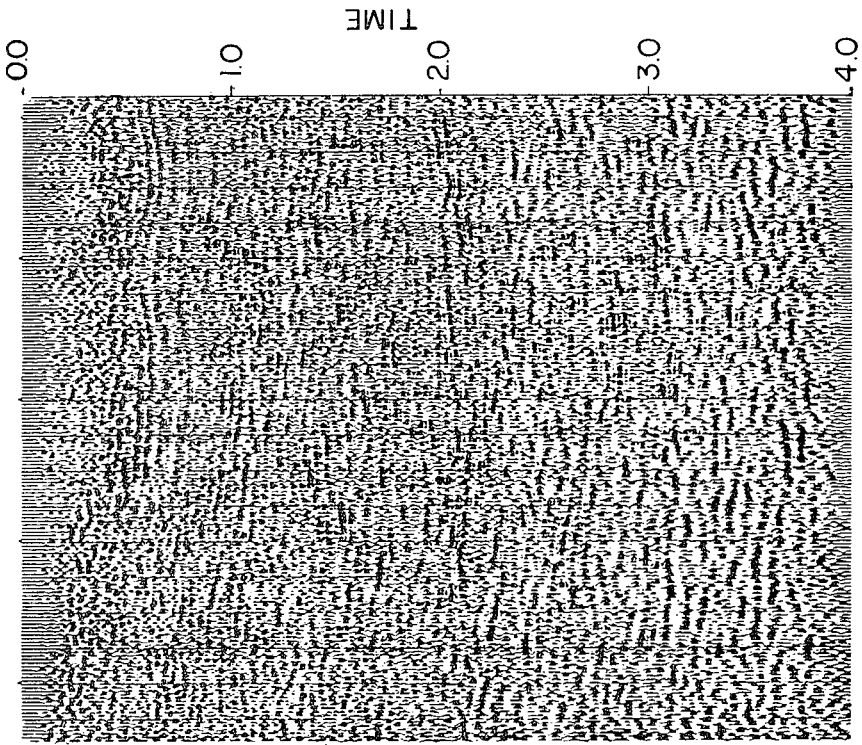

FIG. 2, which comprises FIGS. 2$a$ and 2$b$, shows seismograms of the type which are generated after extensive data processing operations are carried out on the data recorded in the tape unit carried by the exploration vehicle 32. FIG. 2$a$ shows a seismogram made in accordance with prior art exploration and processing techniques while FIG. 2$b$ shows one generated using the method of the invention. That is, the seismogram of FIG. 2$a$ shows CDP-summed traces taken over a substantially continuous range of offsets, e.g. from zero to about 10,000 feet, as usual in the prior art; while FIG. 2$b$ shows a seismogram relating to signals recorded in an optimal narrow range or "window" of offsets beginning at an offset greater than those used in the prior art. In both cases, the vertical axis represents time of receipt of the reflected signal and can be analogized to depth in the earth, while the horizontal axis represents distance along a line of exploration on the earth. Therefore, seismograms of this type represent a cross-sectional view of a "slice" of the earth taken along the line of exploration and extending vertically downwardly into the earth. Those skilled in the art will recognize the superiority of the seismogram shown in FIG. 2$b$ compared with that in FIG. 2$a$, and in particular will note the reflection clearly depicted in FIG. 2$b$ at about 2.2 seconds, which is almost entirely absent from the seismogram shown in FIG. 2$a$.

Figure 3:
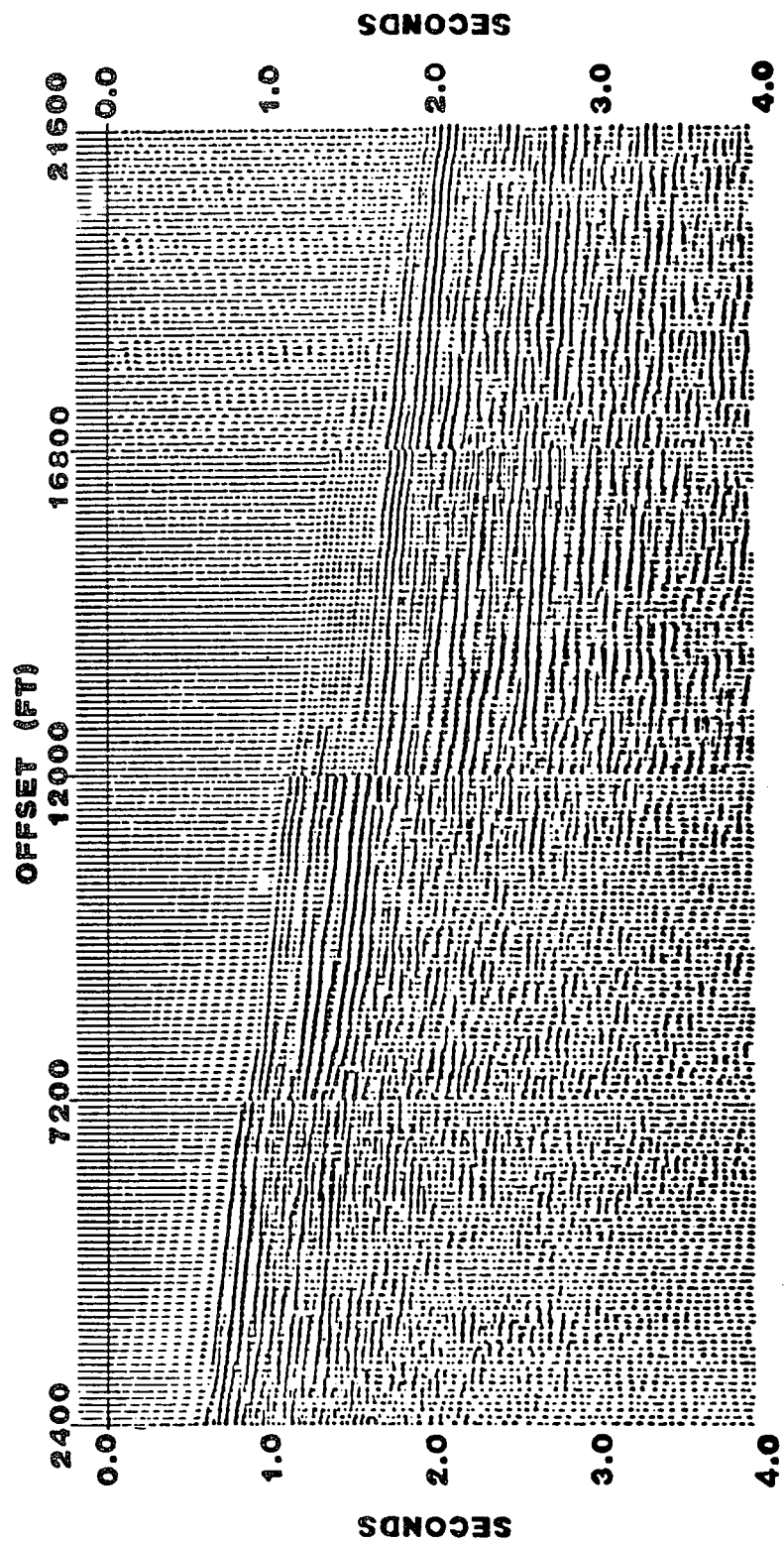
FIG. 3 shows also a seismographic view of the same region which exhibits certain significant features.

FIG. 3 shows a graph of the signal received by a signal array of geophones disposed at increasing offset from a given source point, that is, with respect to increasing source-to-receiver distance. This figure is therefore not precisely comparable to the CDP-summed records shown in FIG. 2. FIG. 3 clearly shows the increasing clarity of reflection due to improved signal-to-noise ratio with increasing offset. In particular, in a "window" between the 12,000 and 16,800 foot offsets clear lines of reflection are shown at about 2.6 seconds. It may therefore be concluded that the offset between source and receiver can be of use in optimizing signal-to-noise ratio in seismic data recording. It was this offset window which was used in recording FIG. 2$b$ as compared to that in FIG. 2$a$, where no particular offset was employed; instead, records from a wide variety of offsets were CDP-summed to yield the representation of FIG. 2$a$, as usual in the prior art.

Figure 4:
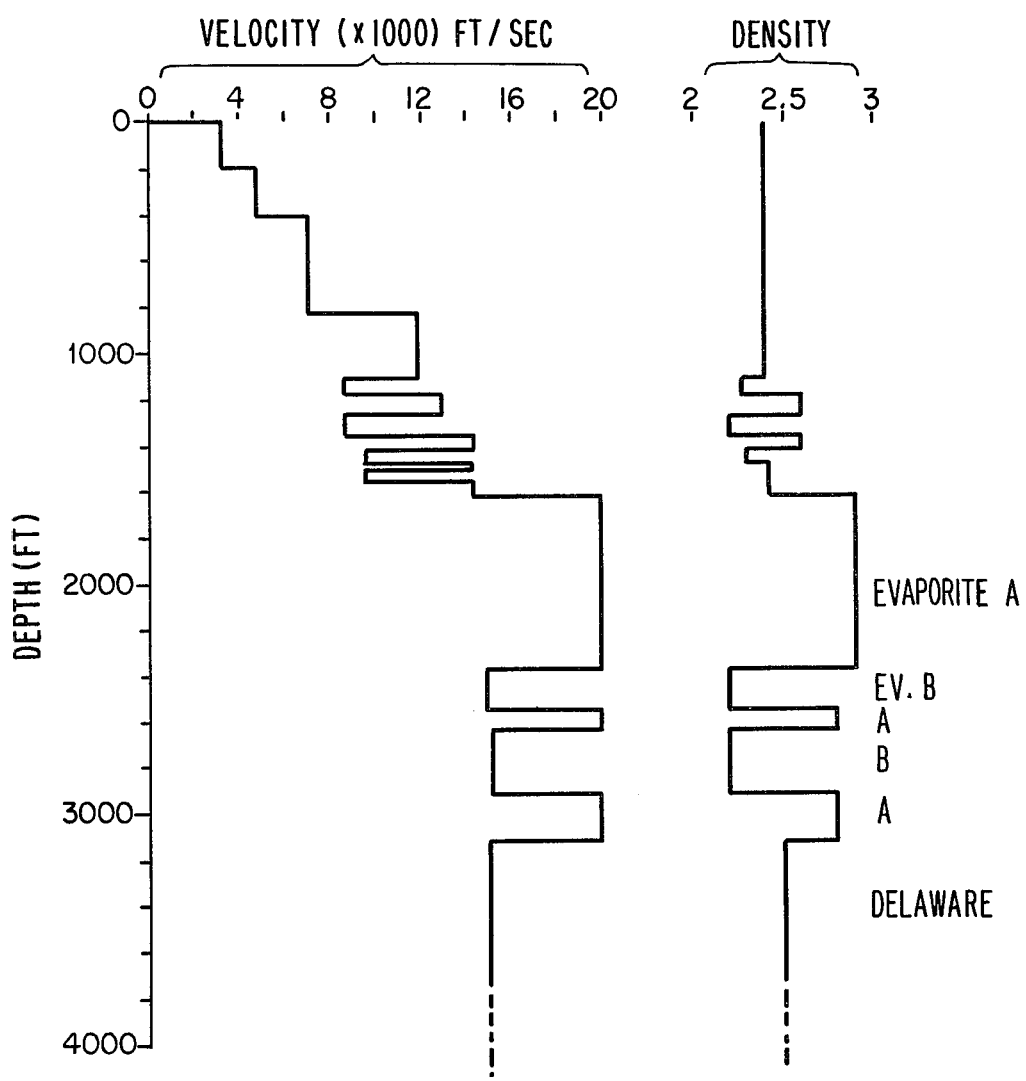
FIG. 4 shows a well-log of one area in which the method of the invention was tested and proved to be useful.
Figure 5:
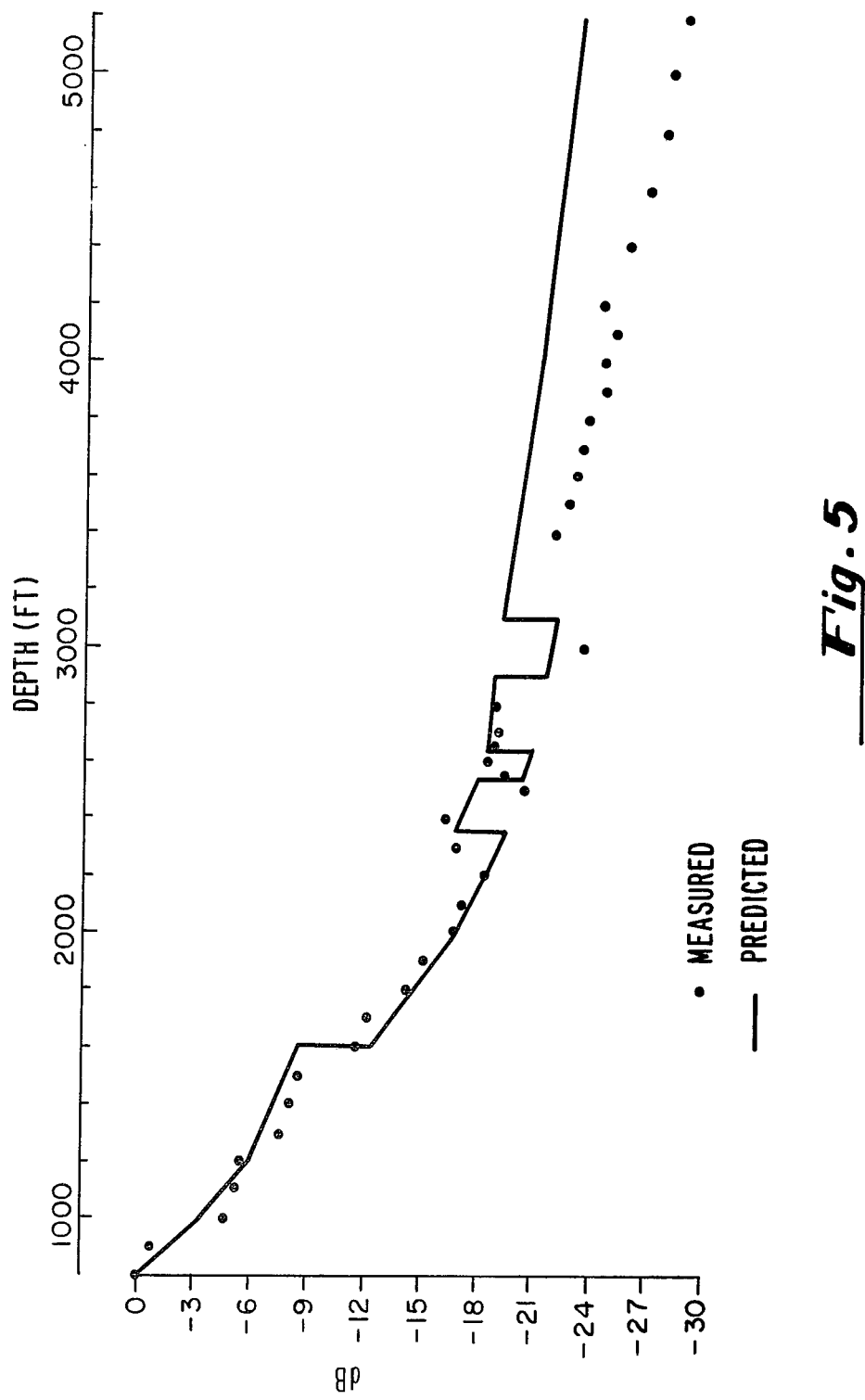
FIG. 5 shows a graph useful in explanation of the method of the invention.

In order to understand the significance of this result, a test program was carried out which will now be described. A test hole was drilled in the region of exploration which yielded the seismograms shown in FIGS. 2 and 3 to a depth of 5300 feet. The compressional wave velocity and earth density were measured using conventional bore hole techniques. Results are shown in FIG. 4 as a function of depth; the general type of evaporite layers which were present are marked to correspond with the variations in velocity and density. The high impedance contrasts formed at the interfaces between the several types of evaporite layers are very clear. These present six consecutive reflection coefficients of approximate absolute magnitude 0.3. A hole locking geophone was used to measure wave amplitude (i.e., attenuation) as a function of depth. The source consists of three vibrators located 300 feet from the well pad. The bandwidth used was 15–11 Hz and 16 sweeps are summed. Recordings were made at 100 foot intervals from 500 feet depth to 5200 feet. FIG. 5 shows the pulse amplitude versus depth, normalized to the amplitude at a depth of 800 feet. The solid line is the calculated amplitude taking divergence and local acoustic impedance into account; that is, it shows the attenuation expected as a function of depth, no allowance being made for transmission effects or inelastic attenuation. The steps in the expected function are due to the evaporite interfaces. The detected amplitude is shown as a series of dots. The difference between the predicted and measured amplitude beneath the evaporite sequence is only 3–4 dB. Hence, transmission losses through this zone cannot explain the general absence of reflected signal from greater depths in this area. In other words, the predicted and measured attentuation of amplitude with depth are in good agreement with respect to a source a fixed distance from the well. Hence, this alone does not explain the curious anomaly shown in FIG. 3.

Figure 6:
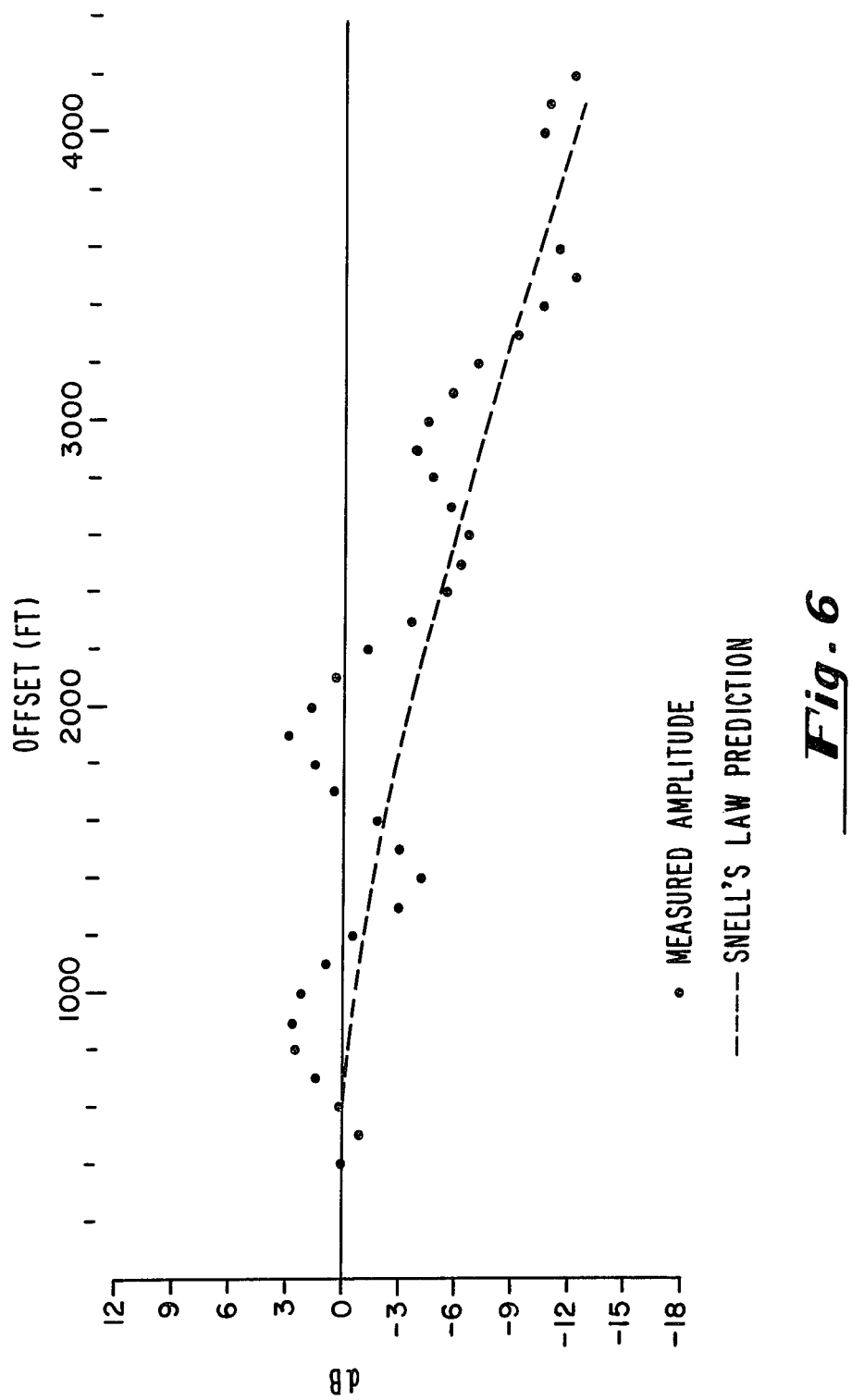
FIG. 6 is a graph of the drop-off in received signal amplitude with respect to offset between source and receiver.

Next, a series of measurements were made to determine the transmission as a function of the angle of incidence of the acoustic wave on the evaporite layer. For this sequence, the geophone was located at a depth of 4000 feet, well below the deepest evaporite layer as shown in FIG. 4. Source points were taken at 100 foot intervals and arranged to 400 to 4200 feet away from the well head. FIG. 6 shows the measured pulse amplitude as a function of offset relative to the pulse amplitude generated at a 400 foot offset. The dashed line in FIG. 6 shows the relative amplitude to be expected when diversion and angle of incidence at the geophone are taken into effect. Generally, the amplitude may be expected to decrease as a function of distance from the source to the geophone, in accordance with Snell's law. However, the measured amplitude, again indicated by a series of dots, shows a cyclical phenomenon according to which the amplitude clearly regularly increases and decreases as a function of the angle of incidence. In some cases, as noted, the received amplitude is actually greater than the amplitude at 400 feet despite a significantly longer ray path. The overall conclusion to be reached from FIG. 6 is that the broad band transmission function varies strongly and cyclically with angle of incidence, and that this is so pronounced a fact that the measured amplitude at some angles is higher than that for vertical incidence, even though the travel path is longer and the downgoing wave passes the fixed vertical geophone at some oblique angle.

Figure 7:
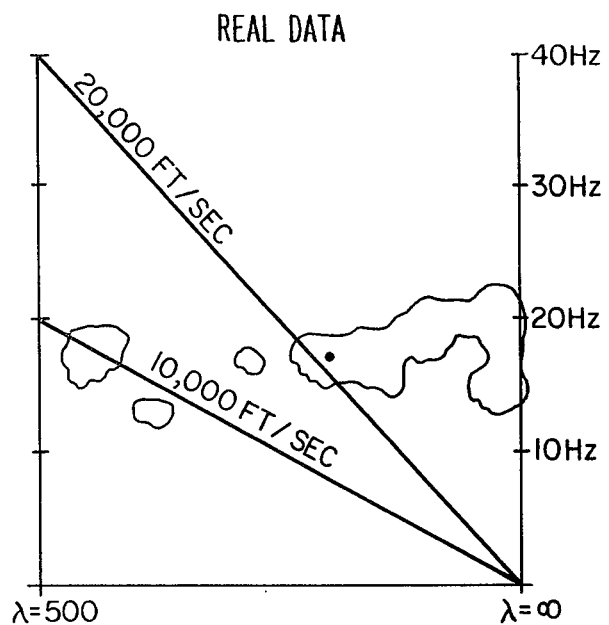
FIG. 7 is an f-k plot of some of the data shown in FIG. 3.

Those skilled in the art will have recognized that the seismogram of FIG. 3 exhibits a substantial quantity of long wave length reverberatory coherent noise. Results of an f-k analysis (that is, a mathematical process used to transform the displacement versus time representation of, e.g., FIG. 3 to a representation of the waves shown as a function of wave number and frequency, a well-known process) performed on this data are shown in FIG. 7. The representation shown graphs the wave number along the horizontal axis from 500 feet to infinity on the right, and frequency from 0 to 40 Hz moving vertically upward on the frequency scale. As is well known, the velocity of a wave relates wave number to frequency and hence, straight lines of various slopes with respect to the wave number and frequency axes are indicative of waves of a given velocity; lines of 10,000 feet per second and 20,000 feet per second slope are shown. The representation used to derive FIG. 7 is such that the black dot almost on the 20,000 feet per second line represents the maximum amplitude, that is, a wave of velocity 20,000 feet per second of approximately 18 Hz and a wave length of on the order of 1150 feet is that which is the most prevalent of all the spectra recorded in FIG. 2a. The contour lines appearing in FIG. 7 are representations of energy recorded in FIG. 2a at a level 6 dB down from the wave of maximum amplitude indicated by the dot and given an indication of the distribution of the overall wave energy. The f-k plot of FIG. 7 is for the offset interval 2400 to 7200 feet and reflects a time interval of 0.4 seconds, spanning the expected arrival time of the signal reflected from the Devonian layer of interest. Three energy peaks are evident in FIG. 7; one in the zone where reflected signal would be expected to give a response, another having a velocity of 20,000 feet per second, the maximum as noted above, and a third having a velocity of approximately 11,000 feet per second. A set of f-k analyses were done for all offset intervals, the time window chosen so as to detect the same Devonian reflection. These were calculated using the arrival time of the detected signal at the long offset and the velocity structure determined from the test well drilled, as well as other wells in the vicinity.

Figure 8:
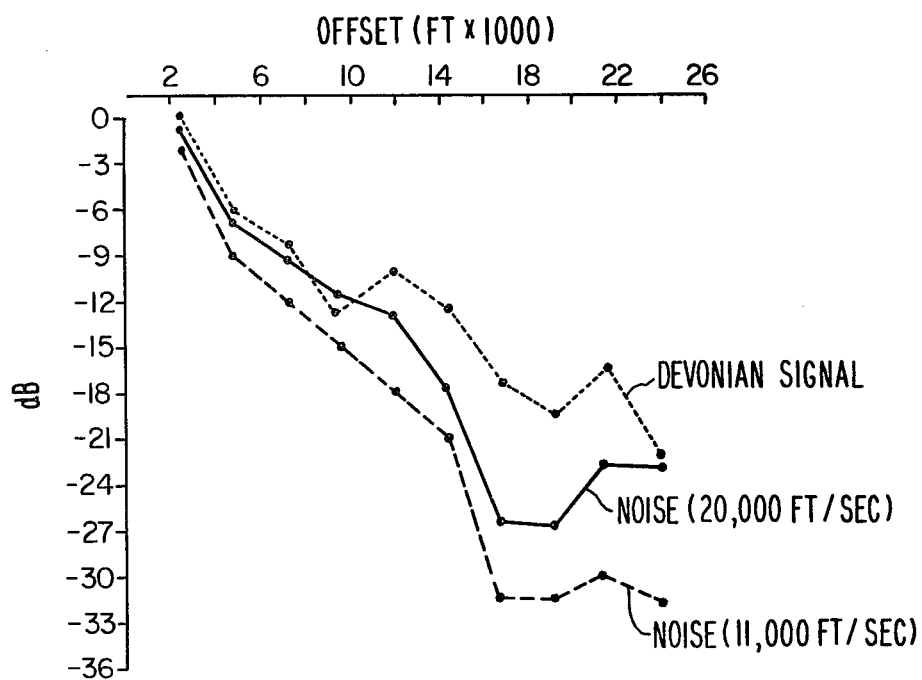
FIG. 8 is a graph representing the drop-off in signal amplitude as compared to noise, both with respect to offset.

The amplitude of the three major energy peaks is plotted as a function of offset in FIG. 8. In the 2,000 to 12,000 foot offset range, the peak in the signal zone has the same amplitude as the noise peaks, that is, the signal-to-coherent noise ratio is less than 1, rendering it impossible to generate a meaningful picture of the subterranean structure of the earth. It will be demonstrated below that the "signal" peak is probably biased on the high side in the graph of FIG. 8 due to multiple reflections at the near offsets. Beyond 12,000 feet, FIG. 8 shows that the signal power becomes higher than the signal peak, which agrees with the visual observation discussed above with respect to FIG. 3. Therefore at offsets of 12,000 feet and up, where the signal-to-noise ratio becomes greater than unity, it is then possible to generate a meaningful representation of the subterranean structure of the earth.

Figure 9:
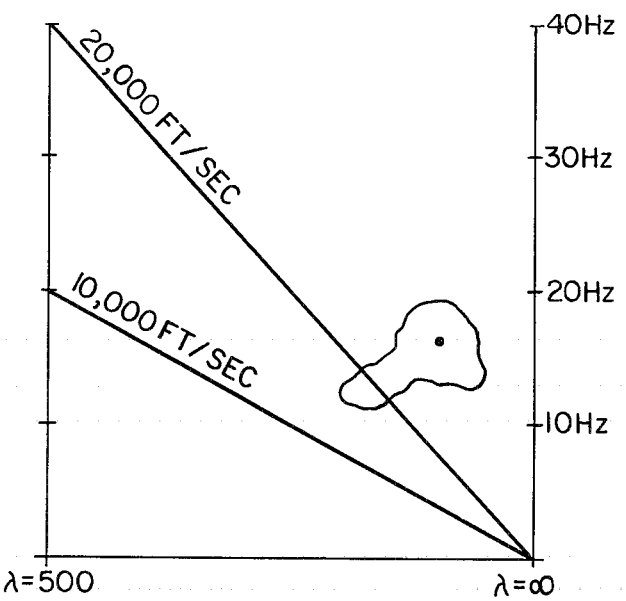
FIG. 9 is an f-k plot of another portion of the data shown in FIG. 3.

FIG. 9 shows an f-k analysis performed with respect to the 12,000 to 16,800 feet interval and reveals that the signal energy is higher than the noise having the average velocity of 20,000 feet per second, that is, confirming the fact that the signal-to-noise ratio is greater than unity in this interval.

Figure 10:
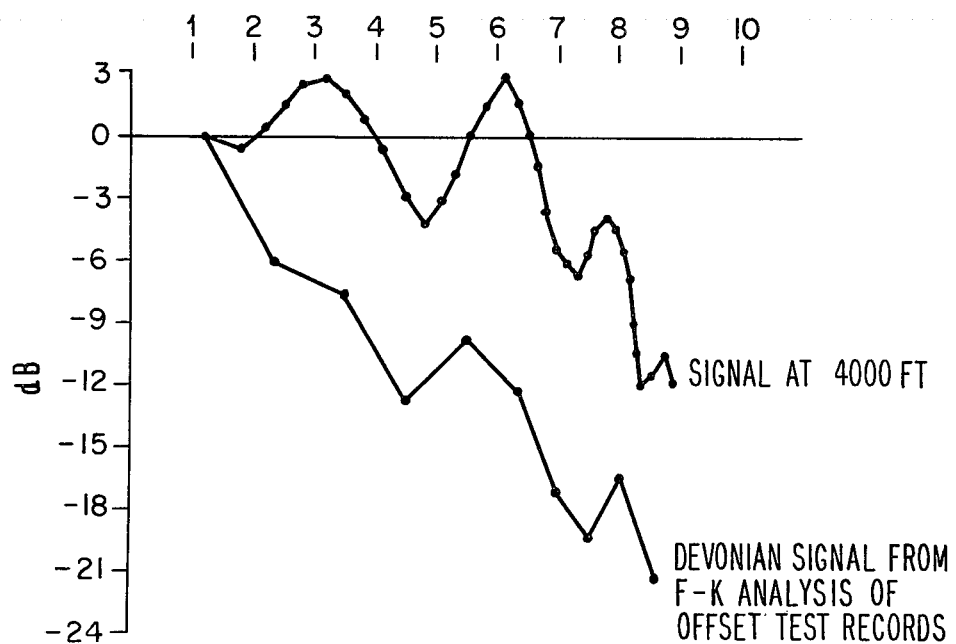
FIG. 10 is a graph comparing the results of the f-k analysis and the received pulse amplitude with respect to angle of incidence.

FIG. 10 compares the signal energy received 4,000 feet deep in the test well with the amplitude of the signal received from reflection from the Devonian layer, both with respect to the takeoff angle. That is, measurements of attenuation made in a well 4,000 feet below the surface with respect to energy generated at a given angle with respect to the vertical is compared in FIG. 10 with the relative amplitude of energy received after reflection at the same angle from the Devonian layer. A correlation appears to be present, particularly with respect to the second peak centered around 6 degrees. It will be appreciated that the indication provided by this Figure is again that there are certain angles at which the attenuation in the evaporite layer is greater and that these are cyclically repeating, as was discussed above with respect to FIG. 6.

The conclusion to be reached from the above observations is that the emergence of the reflected signal at offset distances greater than about 12,000 feet is the result of two interacting phenomena. One is that at shorter offsets, long wavelength noise appears to overshadow the reflected signal; starting at about 12,000 foot offsets, the noise is attenuated sufficiently to allow the signal through. When the offset is such that the ray path coincides with an angle of incidence of the reflected wave on the evaporite layer at which the signal is transmitted therethrough with minimal attenuation, the overall signal-to-noise ratio is greater than unity.

In order to test these conclusions, computer simulation using modeling techniques was performed. The specific model chosen utilizes an analytic solution of the vector wave equation for an arbitrary layered medium. The input parameters are compressional and shear wave velocities ($V_p$ and $V_s$, respectively) density (P), and compressional and shear wave attenuation constants $Q_a$ and $Q_b$, respectively, for each layer, $V_p$ and P were taken as shown in FIG. 4. A single layer was used to model the interval from the base of the evaporites to a depth of 15,000 feet. A $V_p$ of 15,000 feet/sec was chosen and a P of 2.5 grams per cc. These were average values as determined from actual observation of the area of interest. The interface entered into the model at a depth of 15,000 feet was set to yield a reflection coefficient of 0.1 for vertical incidence. Given $V_p$ and P, the modeling technique chosen has the option to calculate $V_s$, $Q_a$ $Q_b$ using known empirical relationships. For example, the shear wave velocity was set based on a $V_p/V_s$ ratio of 1.74, also based on real data. This option was used in this study. A vertical point source was used to simulate a Vibroseis source, and the vertical component of motion at the surface was calculated at a set of different offsets. Frequency and wave number filtering were controlled by specifying the range of the f-k integration performed on the modeling program.

Figure 11:
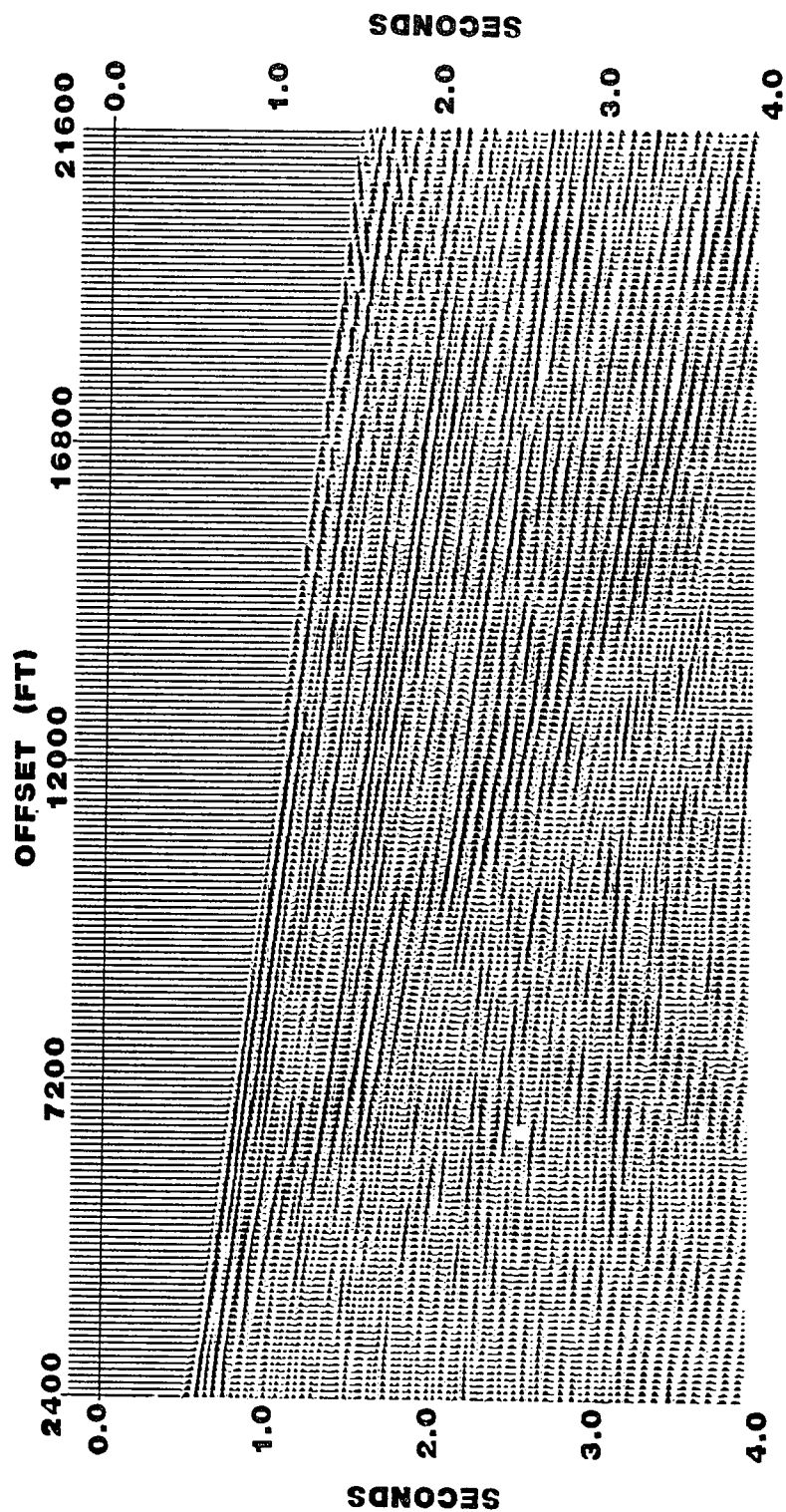
FIG. 11 is a seismogram generated in accordance with a computer model useful in showing the utility of the method of the invention.

FIG. 11 shows an output section generated by this model which is comparable to FIG. 3; that is, this model section is that which the remainder of the modelling program uses as input. Filtering was applied to eliminate any wave motion with a move-out velocity of less than 9,600 feet/sec. This approximates the wave number filtering of the source and receiver arrays used in the actual gathering of data in the field. Comparing FIGS. 11 and 3 shows substantial similarity. The model data shows the same long wavelength reverberatory noise and the reflected signal emerging at approximately 15,000 foot offset.

Figure 12:
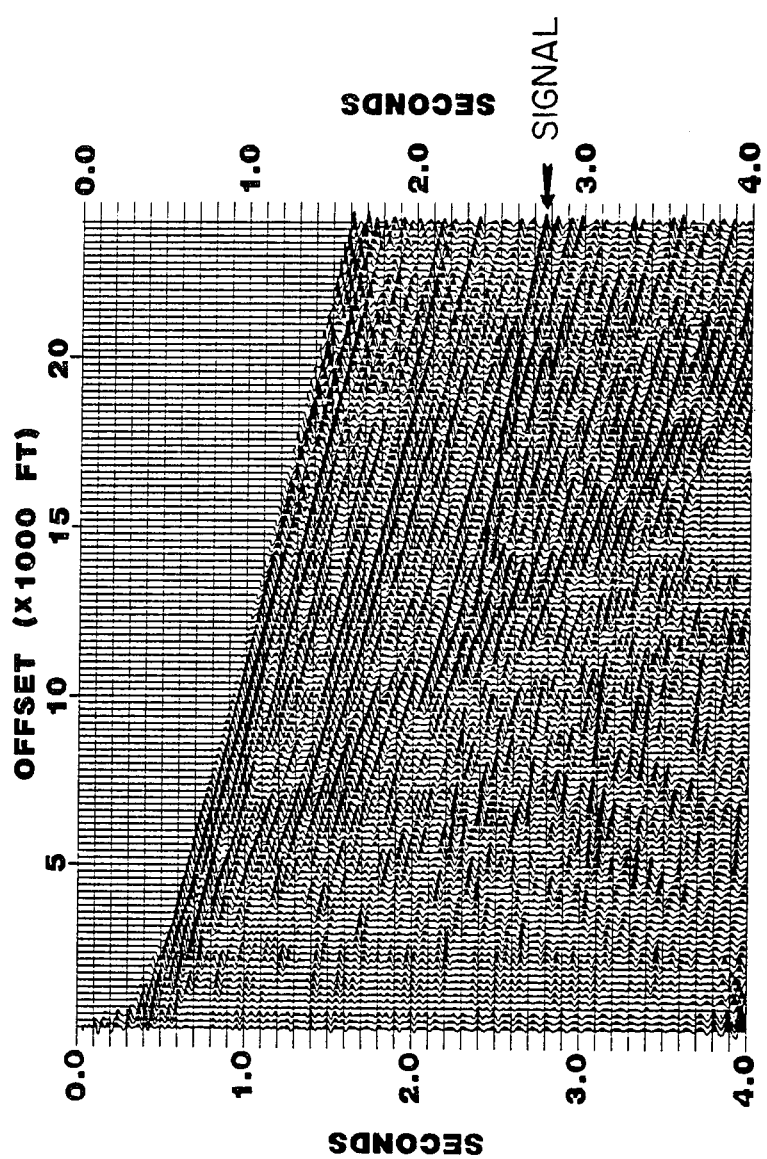
FIG. 12 is the same seismogram as in FIG. 11 but compressed in one dimension to make it easier to read.

FIG. 12 shows the same seismogram as in FIG. 11 but is contracted horizontally to make it easier to read. At near offsets from 0 to 5,000 feet, groups of multiples, that is, repetitive patterns, are evident. The periodicity of 0.5 seconds between each group indicates that they are generated between the surface and the top of the evaporite sequence. The complexity of each group is probably caused by internal multiple reflection within the evaporite sequence. Between 5,000 and 12,000 feet offset, coherent noise becomes dominant and it reverberates through the records. These are interpreted as complex refractions from the evaporite layers in which the velocity of the acoustic wave is 20,000 fps. The signal is seen to emerge at about 12,000 feet.

Figure 13:
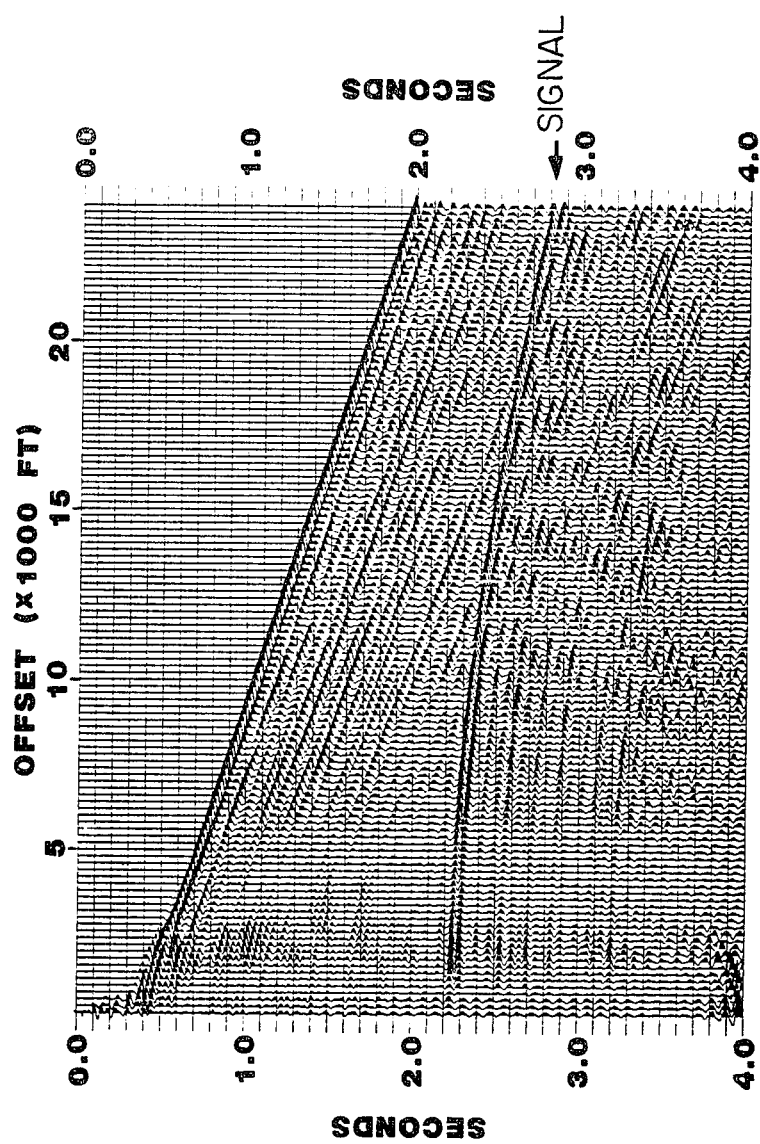
FIG. 13 is comparable to FIG. 12 but with a slightly different model.

A similar model was evaluated but in which the evaporite sequence was replaced with a uniform layer with the same properties as the sub-evaporite layer. The output is shown in FIG. 13, which is a seismogram comparable to that of FIG. 12. With the strong periodic multiples and the reverberations absent, the signal is clearly visible at virtually 0 offset. This establishes that the evaporite sequence is the cause of the two main sources of interference, as discussed above.

Figure 14:
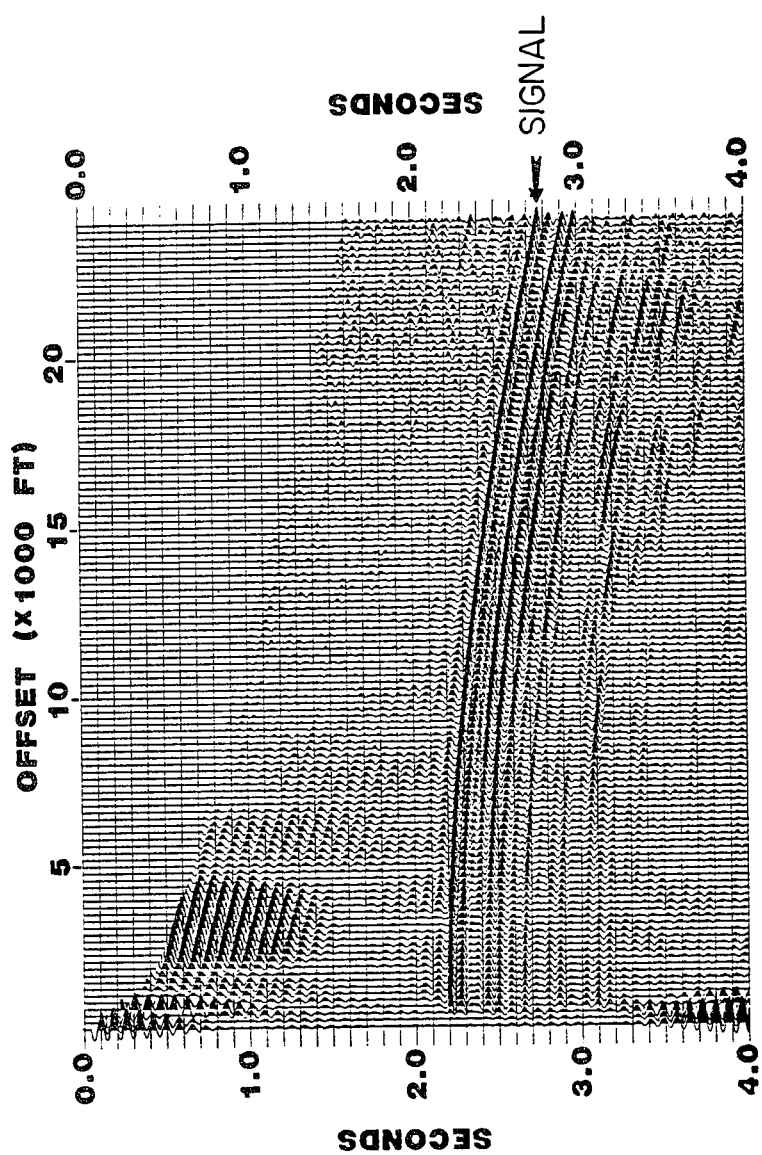
FIG. 14 is also a model seismogram comparable to those of FIGS. 12 and 13 but uses a slightly different model.

To evaluate the question of whether the signal underlies the coherent noise in the model data, the original model was rerun without the reflector, that is, this source of the signal appearing in FIGS. 12 and 13 was eliminated. The resulting output was subtracted trace by trace from the original complete output. The result of the subtraction is shown in FIG. 14. Clearly the signal is present in a complete section underlying the noise; as the signal amplitude is approximately 12 dB down from that of the multiples, it is obscured in FIG. 12. This establishes that the method of the invention is useful in removing noise from signals and is not merely a way of manipulating data in order to yield the appearance of data emerging.

Figure 15A:
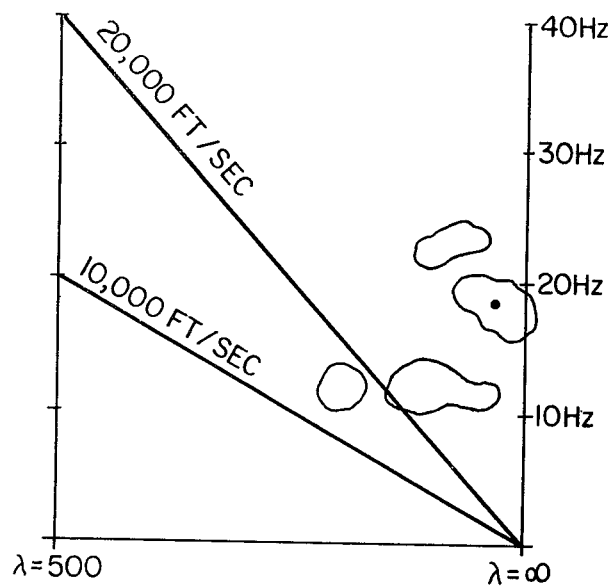
FIG. 15, comprising FIGS. 15$a$ and 15$b$, are plots of f-k analyses of the computer modelled data with and without one feature of the model.
Figure 15B:
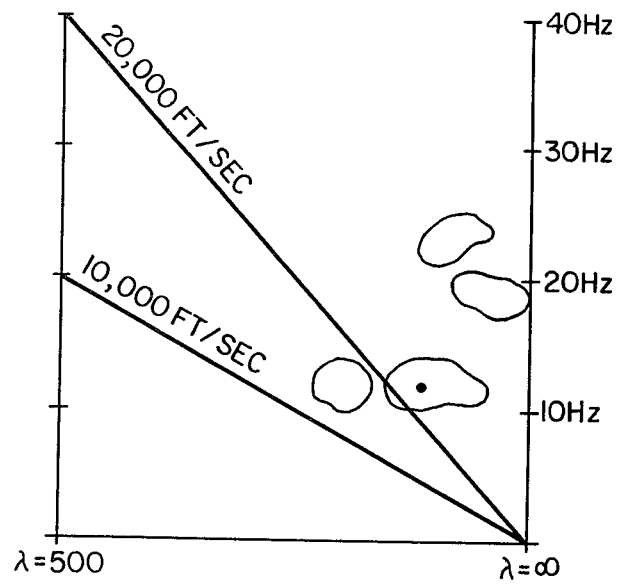

Finally, FIGS. 15a and 15b show f-k analyses of the model data of FIGS. 12 and 13 with and without the deep reflector present, respectively. The plots of the 6 dB down contours are essentially similar; the peak in the signal zone is only slightly enhanced with a deep reflector present in FIG. 15a. This result demonstrates that the multiples supply significantly energy in the signal zone in the model data. That is, the reflection in the evaporite layers serve to obscure the reflected signal as discussed above.

Several attempts using various prior art techniques to remove the multiples from the model data were tried for the sake of comparison, but all were unsuccessful. First, spike and gapped deconvolution methods were used. The operator length used in the spike deconvolution method was 750 milliseconds, which is much longer than is usually applied, and presumably introduced too much noise into the system. Gapped deconvolution was believed to have failed due to nonstationarily between multiple groups. Slant stack deconvolution applied to the model data did attenuate the multiples sufficiently for the signal to be visible at lesser offsets, but this did not work on the real data. Furthermore, both velocity and f-k filtering techniques were applied in an attempt to filter out the reverberatory refractions. Neither worked, due to the short separation in f-k space between the coherent noise and the signal, and to the edge effects of the filters being sufficient to mask the signal in velocity filtering efforts.

Therefore, it appears that the method of the invention is useful to remove noise in circumstances under which prior art methods demonstrably fail. Accordingly, therefore, the method of the invention comprises sampling of seismic signals recorded at differing source-to-receiver offsets, in particular in an area of "window" within which the signal-to-noise ratio is highest. It will, of course, be appreciated that this method need not be employed in all circumstances, but it may well be that in many regions of exploration, the signal-to-noise ratio can be improved simply by choosing offset windows for examination rather than performing common depth point stacking techniques with respect to all data recorded with respect to a single point on a particular reflector of interest. Moreover, it will be appreciated by those skilled in the art that the method of the invention, that is, selection of data from a given offset window for use in generation of a representation of the subterranean structure, need not be performed in the field but indeed that data from a wide variety of offsets can be recorded in the field and only later be selected for CDP stacking operations.

Those skilled in the art will recognize that there has been described and discussed the reasons why certain areas have typically yielded seismic data of extremely poor quality. Despite the fact that direct bore hole measurements show that transmission losses through the evaporite sequence itself are small, it is now realized that the angle of the transmission with respect to the evaporite sequence is also important and that in order to control this angle, the offset between source and receiver is likewise of importance. Moreover, it will be appreciated that the modeling described above indicates that the reflected signal is present in the seismic data throughout the range of offsets but is only visible in the case modelled over 12,000 feet for the following reasons. In the offset range from 0 to 5,000 feet, high amplitude multiples generated between the earth's surface and the evaporite sequence appear to obscure the signal. The moveout velocity of these multiples at near offset is essentially the same as the signal, so normal moveout correction and stacking does not attenuate them; nor does deconvolution, for the reasons mentioned above. In the offset interval 5,000 to 12,000 feet reverberatory refractions within the anhydrite sequence destructively interfere with the signal. The movement velocity in this region, 20,000 fps, is so high and so close to that of the signal that once again normal moveout correction and stacking does not improve the signal-to-(coherent) noise ratio; nor do velocity or f-k filtering techniques. As is well known, a refracted acoustic wave in the earth attenuates by a factor at least as large as the reciprocal of the square of the offset distance. The amplitude of the signal reflected from 15,000 feet, however, decreases very little as a function of offset. This relationship, aided by a local maximum in the broad band transmission function through the evaporites results in a signal-to-noise ratio exceeding unity at offsets in excess of 12,000 feet, in the example described; it will of course be appreciated by those skilled in the art that the actual offset applied will vary with respect to the depth of the reflector of interest below the surface, so as to equate the angle of incidence of the reflected wave on the reflector and the evaporite sequence with the angle at which the broad band transmission through the evaporite layer(s) is maximized.

While a particularly preferred embodiment of the invention has been described, it will be understood that the invention is not so limited; instead, the above description is exemplary only, and the scope of the invention is limited only by the following claims.

I claim:

1. A method for exploring subterranean structures of the earth having at least one reflection interface which has a broadband acoustic wave reflection attenuation characteristic which varies cyclically with the angle of acoustic wave incidence, comprising the steps of:
   (a) transmitting acoustic waves into the earth from a plurality of sources located along the surface of the earth;
   (b) detecting reflected acoustic waves from said reflection interface at a plurality of receivers offset from said plurality of sources along the surface of the earth;
   (c) gathering said reflected acoustic waves into groups of selected offset intervals;
   (d) determining from said gathered acoustic waves at what incidence angles, with respect to said subterranean interface having said cyclical attenuation characteristic, said acoustic energy is reflected with minimum attenuation;
   (e) selecting a portion of said gathered acoustic waves which have offsets from acoustic wave sources to acoustic wave receivers such that the angle of incidence and reflection of the acoustic waves from said interface are substantially equal to the incidence angles at which attenuation of reflection acoustic waves at said interface is minimized;
   (f) processing said selection portion of said gathered acoustic waves using common depth point stacking to produce signals having an improved signal-to-noise ratio; and
   (g) producing seismograms from said signals.

2. The method of claim 1 wherein said steps of determining said incidence angles includes the steps of performing an f-k analysis on the detected reflection signals in a plurality of selected offset intervals to identify those offsets for which the signals-to-noise ratio of said detected reflection signals becomes greater than unity.

3. The method of claim 2 wherein said selected offset intervals include source-to-received offsets extending from 12,000 feet and up.

* * * * *